United States Patent
Knjazihhin et al.

(10) Patent No.: US 9,304,893 B1
(45) Date of Patent: Apr. 5, 2016

(54) INTEGRATED SOFTWARE DEVELOPMENT AND TEST CASE MANAGEMENT SYSTEM

(71) Applicant: EMC Corporation, Hopkinton, MA (US)

(72) Inventors: Denis Knjazihhin, Brighton, MA (US); Joseph Xavier Lawrence, Jr., East Boston, MA (US); David Shapiro, Waltham, MA (US); Dan Uwe Zehme, Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 32 days.

(21) Appl. No.: 14/200,604

(22) Filed: Mar. 7, 2014

Related U.S. Application Data

(60) Provisional application No. 61/774,614, filed on Mar. 8, 2013.

(51) Int. Cl.
*G06F 9/44* (2006.01)
*G06F 11/36* (2006.01)

(52) U.S. Cl.
CPC .................................. *G06F 11/3684* (2013.01)

(58) Field of Classification Search
None
See application file for complete search history.

(56) References Cited

U.S. PATENT DOCUMENTS

| | | | |
|---|---|---|---|
| 6,249,882 B1 * | 6/2001 | Testardi | 714/38.14 |
| 7,797,680 B2 | 9/2010 | Haas | |
| 8,463,760 B2 | 6/2013 | Himstedt et al. | |
| 8,561,036 B1 | 10/2013 | Beans et al. | |
| 2002/0029377 A1 * | 3/2002 | Pavela | 717/124 |
| 2003/0196190 A1 * | 10/2003 | Ruffolo et al. | 717/124 |
| 2004/0153830 A1 * | 8/2004 | Cebula et al. | 714/38 |
| 2007/0088986 A1 * | 4/2007 | Stark et al. | 714/32 |

OTHER PUBLICATIONS

Wikipedia, "Javadoc", http:/en.wikipedia.org/wiki/Javadoc, Internet Archive Feb. 14, 2012.*
JavaWorld, "JUnit Best Practices", http://www.javaworld.com/article/2076265/testing-debuggin/junit-best-practices.html, Posted Dec. 21, 2000.*
StackOverflow, "Java Reflection: Count of methods with an annotation", http://stackoverflow.com/questions/1833533/java-reflection-count-of-methods-with-an-annotation, Posted Dec. 2, 2009.*
Technical Blog for Jim Beveridge, "NUnit Unit Testing with C++", http://qualapps.blogspot.com/2009/10/nunit-unit-testing-with-c.html, Posted Oct. 12, 2009.*

* cited by examiner

*Primary Examiner* — Wei Zhen
*Assistant Examiner* — Timothy Duncan
(74) *Attorney, Agent, or Firm* — BainwoodHuang

(57) ABSTRACT

Improved techniques involve marking each test case routine written in the source code with test case identifiers that describe that test case routine. Software in a development system parses source code to locate such identifiers and, upon compilation of the source code, generates a report based on those identifiers. Advantageously, the improved techniques ensure that test cases remain current with the source code.

21 Claims, 6 Drawing Sheets

Web-Based Report 40(a)
                                                                                              50

| Test Method 42 | Use Case 44 | Test Steps 46 | Scenarios 48 | JIRA Tickets |
|---|---|---|---|---|
| testCustomerUserCreate 52(a) | Create a user within an existing customer account. | 1. Login to operations app as a valid user 2. Create a customer user account. 3. Verify user. | OPS-1; OPS-79; OPS-80; OPS-81; OPS-95; OPS-96; OPS-100 | ACM-33023 |
| testCustomerUserEdit 52(b) | Edit a user within an existing customer account. | 1. Login to operations app as a valid user 2. Create a customer user account. 3. Edit the new customer user account 4. Verify user. | OPS-1; OPS-79; OPS-80; OPS-81; OPS-39; OPS-95; OPS-96; OPS-100 | ACM-33023 |

Figure 3(a)

Web-Based Report 40(b)

| Scenario Ticket Number 60 | Scenario Frequency 62 |
|---|---|
| OPS-1 | 2 |
| OPS-39 | 4 |
| OPS-79 | 17 |
| OPS-80 | 13 |
| OPS-81 | 13 |
| OPS-95 | 7 |
| OPS-96 | 8 |
| OPS-100 | 3 |

INTEGRATED SOFTWARE DEVELOPMENT AND TEST CASE MANAGEMENT SYSTEM

CROSS REFERENCE TO RELATED APPLICATIONS

This Patent Application is a Non-provisional utility application which claims the benefit under 35 U.S.C. §119(e) from U.S. Provisional Patent Application No. 61/774,614 filed on Mar. 8, 2013, entitled, "TEST REQUIREMENT COVERAGE USING MARKERS", the contents and teachings of which are herein incorporated by this reference in their entirety.

BACKGROUND

Modern software development typically involves constructing and running high quality automated test cases. Automated test cases are routines, macros, or scripts that call compiled executables built from source code under test. When run, such test cases pass specified parameters to the compiled executables, which in turn generates test case output. In some scenarios, quality assurance (QA) personnel use the output from running the test cases to determine which bugs in a bug report may be closed.

In a conventional test case environment, QA personnel use a test case management system (TCM) to manage the test cases and their output. A typical TCM has a database for storing information about the test cases as well as their respective output. For example, a TCM may list a test case identifier, bugs and requirements that the test case addresses, output from the latest software build in an entry in the database, and whether the test case passes or fails according to goals set for the test case.

SUMMARY

Unfortunately, there are deficiencies with the above-described conventional test case environment. For example, the test case code and source code are typically developed in separate environments by different groups of people, e.g., software engineers for the former and QA engineers for the latter. In such an environment, it is difficult to synchronize versions of the source code and the test case code as each is managed separately. Thus, a report generated within a TCM may not reflect the latest version of the source code. For example, suppose that an initial requirement of software under development involves displaying a dialog box when an incorrect password was input into a login window. A TCM might have in its database a series of test cases that test whether such a dialog box appears in response to an incorrect password under various scenarios. Suppose further, however, that the software developers have updated the dialog box to a warning within the login window. Because the development of the software is separate from the development of the test cases, it is plausible that test case reports never record this change and thus do not accurately reflect updated requirements of the software under test.

In contrast to the above described conventional test case environment in which test case reports may not accurately reflect requirements of the source code, improved techniques involve marking each test case routine written in the source code with test case identifiers that describe that test case routine. Software in a development system parses source code to locate such identifiers and, upon compilation of the source code, generates a report based on those identifiers. Advantageously, the improved techniques ensure that test cases remain current with the source code.

One embodiment of the improved techniques is directed to a method of producing a test case report. The method includes parsing, by a computing device, the source code to locate sets of test case identifiers, each set of test case identifiers including symbols distinct from symbols used in syntax of the source code and describing of a corresponding test case routine of a set of test case routines within the source code. The method also includes compiling, by the computing device, the source code. The method further includes outputting, by the computing device, the test case report based on the set of test case identifiers, the test case report describing the set of test case routines within the source code in response to the compiling of the source code.

Additionally, some embodiments of the improved techniques are directed to an apparatus constructed and arranged to produce a test case report. The apparatus includes a network interface, memory, and a controller including controlling circuitry constructed and arranged to carry out the method of producing a test case report.

Furthermore, some embodiments of the improved techniques are directed to a computer program product having a non-transitory computer readable storage medium that stores code including a set of instructions which, when executed by a computer, cause the computer to carry out the method of producing a test case report.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 3(*a*) is a table illustrating an example test case report within the computing device shown in FIG. 1.

FIG. 3(*b*) is another table illustrating an example test case report within the computing device shown in FIG. 1.

DETAILED DESCRIPTION

Figure 1:
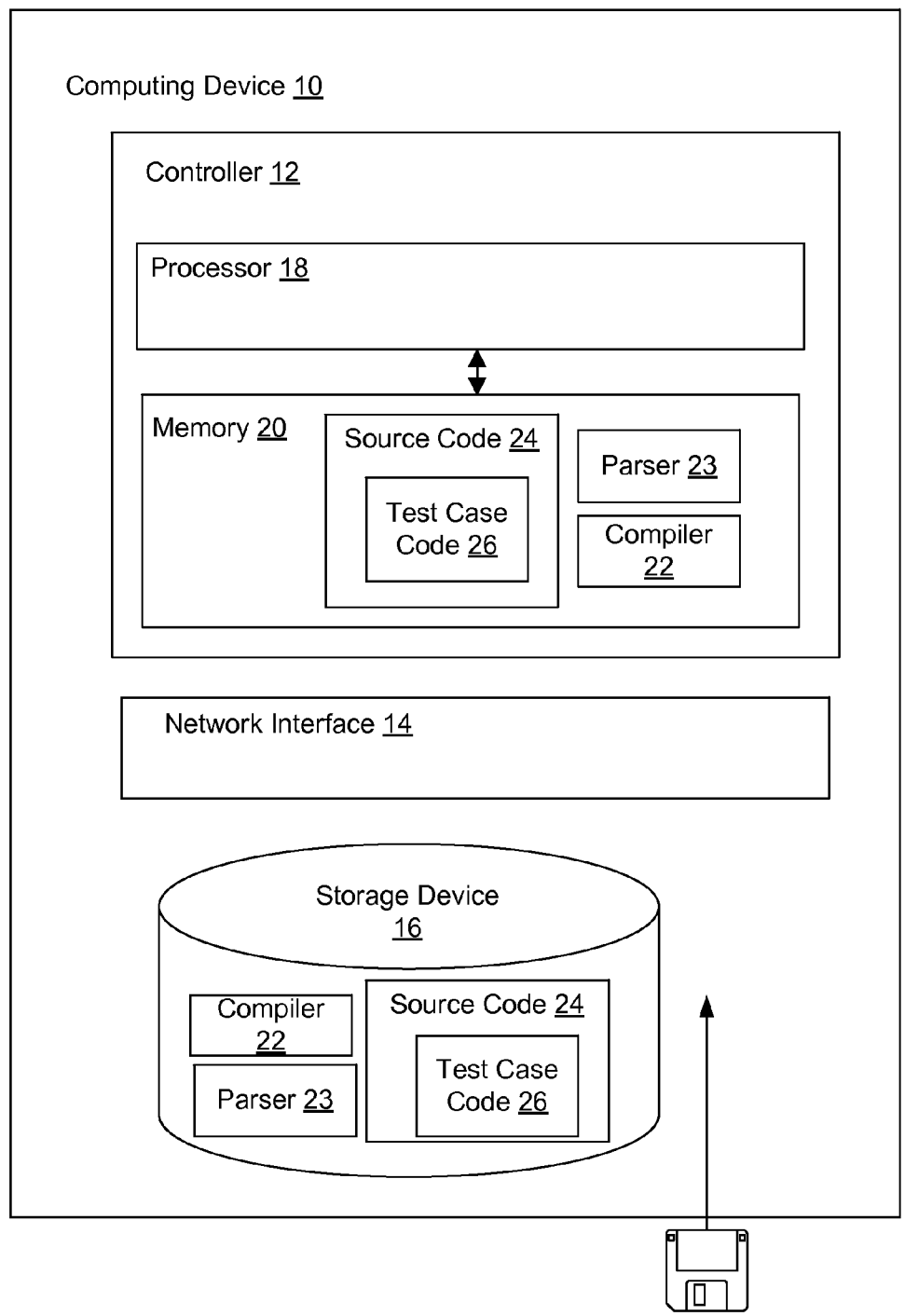
FIG. 1 is a block diagram illustrating an example computing device for carrying out the improved techniques.

Improved techniques involve marking each test case routine written in the source code with test case identifiers that describe that test case routine. Software in a development system parses source code to locate such identifiers and, upon compilation of the source code, generates a report based on those identifiers. Advantageously, the improved techniques ensure that test cases remain current with the source code. FIG. 1 illustrates an example computing device 10 for carrying out the improved technique. Computing device 10 includes a controller 12, which in turn includes processor 18 and memory 20. Computing device 10 also includes network interface circuitry 14 and storage device 16.

Network interface circuitry 14 is configured to access a computer network. Network interface circuitry 14 may take the form of an Ethernet card; in some arrangements, network interface circuitry 14 may take other forms including that of a wireless receiver or a token ring card, for example.

Storage device 16 is configured to store data persistently. Storage device 16 includes non-volatile memory and takes the form of, but is not limited to, disk memory and/or solid-state memory.

Processor 18 may take the form of, but is not limited to, Intel or AMD-based CPUs, and can include a single or multiple cores each running single or multiple threads. Processor 18 is coupled to memory 20 and is configured to execute instructions from compiler 22 and source code 24.

Memory 20 is configured to store source code 24. Memory 20 is further configured to store compiler 22. Memory 20 generally takes the form of, e.g., random access memory, although in some arrangements memory 20 includes flash memory or a non-volatile memory.

Compiler 22 includes a set of instructions for compiling source code 24 and building executable software (e.g., libraries, DLLs, binaries, and the like) from the compiled source code.

Parser 23 includes a set of instructions for parsing source code 24 in order to locate test case identifiers that describe routines within test case routine 30. Parser 23 further includes a set of instructions for generating a report containing results of running the routines of the test cases.

Source code 24 includes routines written by software developers that are intended to be compiled into a software product that satisfies a set of requirements. Among the various lines of code are comments used for explaining what each code segment does, identifying the author, and the like. As is known in the art, comments are demarcated with special symbols such as "\* *\". Compiler 22 is configured to not include text within comment markers in a compilation. Parser 23, on the other hand, is configured to examine test case code identifiers within the comments in the cases when the identifiers are located within the comments.

Source code 24 also includes routines of test case code 26. In some arrangements, such as when test case code 26 is written in a different language from source code 24, routines of test case code 26 are demarcated using particular markers so that compilation software knows to not include them in compilation. In other arrangements, however, when test case code 26 and source code 24 are written in the same language, compiler 22 may compile both test case code 26 and source code 24 together, It should be understood that source code 24 may be arranged in separate files within a project. For example, in object-oriented code written in Java or C++, it is common for each class to be written into separate files, with each routine being a method of that class. Each routine in these languages may also have a header file containing routine metadata such as files that contain routines used in the current routine.

Further, each test case routine has metadata that describes that test case routine; the metadata is demarcated by special symbols within comments for reporting purposes. The metadata includes, for example, a description of the use case, the steps performed by the test case routine, the scenarios that are being tested, and any active bugs around which the test case routine was written. Further detail about the test cases is provided in FIG. 2.

Figure 2:
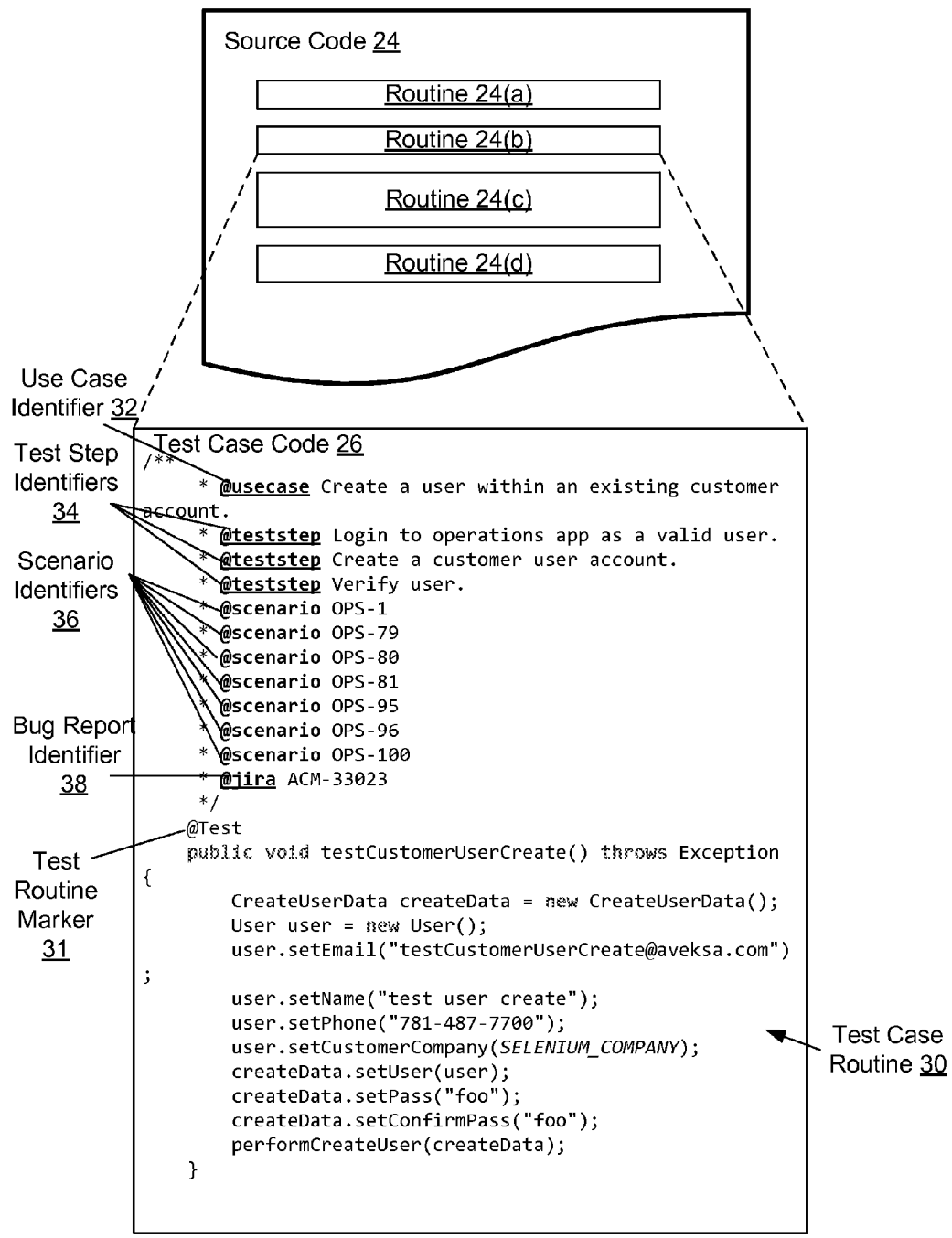
FIG. 2 is a block diagram further illustrating example source code within the computing device shown in FIG. 1.

FIG. 2 illustrates a detailed perspective of example source code 24 and test case code 26. Source code 24 includes a set of routines 24(*a*), 24(*b*), 24(*c*), and 24(*d*). In this example, routine 24(*b*) is actually a test case routine within test case code 26.

Test case code 26, as described above, contains a routine 30 that is run by compiler 22 (see FIG. 1) upon completion of the build of source code 24. In the example shown in FIG. 2, the routine is written in Java code; the routines of test case code 26 may be written in any language, compiled or interpretive. Routine 30 has a marker 31 that is a statement ("@Test") outside of comments; marker 31 identifies routine 30 as a test case routine rather than a source code routine.

It should be understood that test case routines written in a compiled language may either be compiled with the source code or separately from the source code. Further, in some arrangements, test case code 26 may be written in an interpretive macro language. For example, source code 24 may be associated with an application programming interface (API) that has its own macro language which calls executable routines.

Appearing also within test case code 26 is the metadata for routine 30. It should be understood that the various elements of the metadata each have a separate identifier for recognition by compilation software 22. As shown in FIG. 2, test case code 26 includes a use case identifier 32 for identifying a use case; the identifier, shown in FIG. 2, is "@usecase". Test case code 26 also includes test step identifiers 34 for identifying the test steps of routine 30 ("@teststep"). Test case code 26 further includes scenario identifiers 36 for identifying scenarios such as requirements that routine 30 must satisfy in order that the test case pass ("@scenario"). In some arrangements, test case code 26 also includes bug report identifiers 38, such as that from a JIRA bug tracking system ("@jira").

During an example operation, compiler 22 parses source code 24 in a similar manner as a typical software compiler, in that compiler 22 searches outside of comments for source code 26 which compilation software recognizes as properly expressed code in, e.g., Java, C++, etc.

For each routine compiler 22 identifies, however, compiler 22 checks for a "@test" identifier. If such an identifier is found, then the routine is a test case routine and is temporarily excluded from the build process. Parser 23 then locates test case identifiers as described above in lines of code adjacent to such a test case routine. In some arrangements, these test case identifiers are located within comment markers containing text that compiler 22 is configured to ignore.

If no such identifier is found, however, then compiler 22 includes the routine in the normal compilation and build process. It should be understood that, if there is a syntax error or some other error that stops normal compilation, then compilation software releases test cases routines such as routine 30 from memory and ceases the build process altogether.

For each "@test" identifier, parser 23 parses comments immediately above the routine to locate the various metadata identified by respective identifiers, e.g., "@usecase," "@teststep," "@scenario," and "@jira." Once the metadata for a routine is parsed, parser 23 places the metadata in a location in memory 20 corresponding to the location in memory 20 where its routine is stored, e.g., in a location adjacent to it routine.

In the case that test case code 26 is written in a compiled language, compiler 22 performs a compile and build operation on test case code 26. In some arrangements, however, compiler 22 may perform a single compile and build for both source code 24 and test case code 26. In still further arrangements, when test case code 26 is written in an interpretive language, compiler 22 places the routine in memory 20 until source code 26 is built. Once source code 24 is compiled and the subsequent executables are built, compiler 22 begins to access test case routines, e.g., routine 30 from memory 20 for running against the newly built executables.

Upon completion of the compilation, parser 23 generates a human-readable report containing all of the gathered test case information from the metadata. In some arrangements, the human-readable report is generated in HTML to be displayed in a web browser window on a computer, or sent to a remote system via network interface 14. Further details of such a report will now be described in connection with FIGS. 3(a) and 3(b).

FIG. 3(a) illustrates part 40(a) of an example web-based report generated by compiler 22 (see FIG. 1) after completion of a compilation process. Web-based report 40(a) contains a table having a test method field 42, a use case field 44, a test steps field 46, a scenarios field 48, and a JIRA tickets field 50. Report 40(a) also has entries 52(a) and 52(b) containing values of these fields.

Entry 52(a) contains values of fields 42, 44, 46, 48, and 50 corresponding to those extracted from routine 30 (see FIG. 2), while entry 52(b) contains values of those fields corresponding to another test case routine. For example, the value of the test method field 42 is testCustomerUserCreate() which is the name of routine 30. The value of use case field 44 is the value of the metadata marked with the @usecase identifier. The value of text steps field 46 is the value of the metadata marked with the @teststep identifier. The value of the scenarios field 48 contains all of the metadata marked with the @scenarios marker; note that each such scenario has its own @scenario marker and is separated in the entry 52(a) by semicolons. The value of the JIRA Tickets field 50 contains the metadata marked with the @jira identifier. In some arrangements, web-based report 40(a) will also include output from each test case and an indication of whether the test case has passed or failed.

FIG. 3(b) shows another part 40(b) of the example web-based report. This part 40(b) shows each individual scenario, arranged by scenario ticket number 60, and its corresponding scenario frequency 62 throughout the entire test code set. For example, the scenario having ticket number OPS-1 shows up in two routines, while the scenario having ticket number 4 shows up in four routines, and so on.

In some arrangements, each listed scenario in fields 48 and 60 contains a hyperlink to a wiki page defining that scenario. Such a wiki page is illustrated in FIG. 4.

Figure 4:
FIG. 4 is a table illustrating test case scenarios from the output shown in FIG. 3(*a*).

FIG. 4 illustrates a wiki page 70 that provides definitions for all listed scenarios in the test case code 26 (see FIG. 1). Wiki page 70 in this case is arranged in a table having a scenario identifier field 72 and a scenario definition field 74. For example, the first entry shown in the table has a value of scenario identifier field 72 of "OPS-79". According to this entry, OPS-79 corresponds to the requirement that the menu item for users, and the actions available form the users page, will be available only to operations application users with the superadmin or operator role. The passing or failing of each test cases that contain this scenario depend on the output of the corresponding test case routine satisfying this requirement.

It should be understood that wiki page 70 may be stored in storage device 16 on computing device 10. In some arrangements, however, wiki page 70 may be stored in a central location remote from computing device 10.

Figure 5:
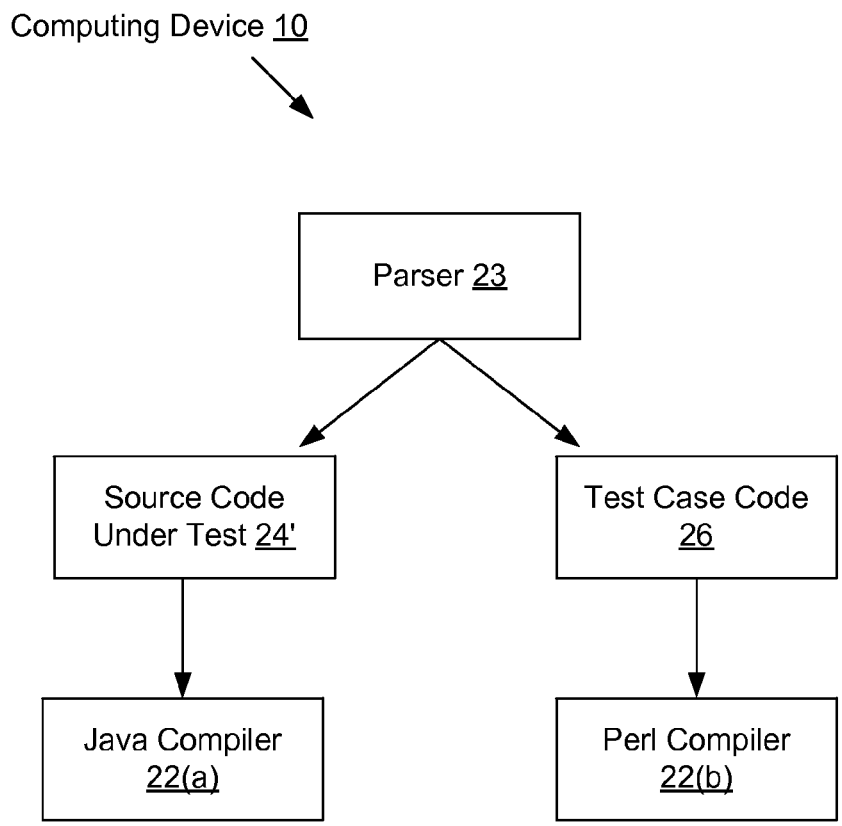
FIG. 5 is a block diagram illustrating a compilation operation within the computing device shown in FIG. 1.
Figure 6:
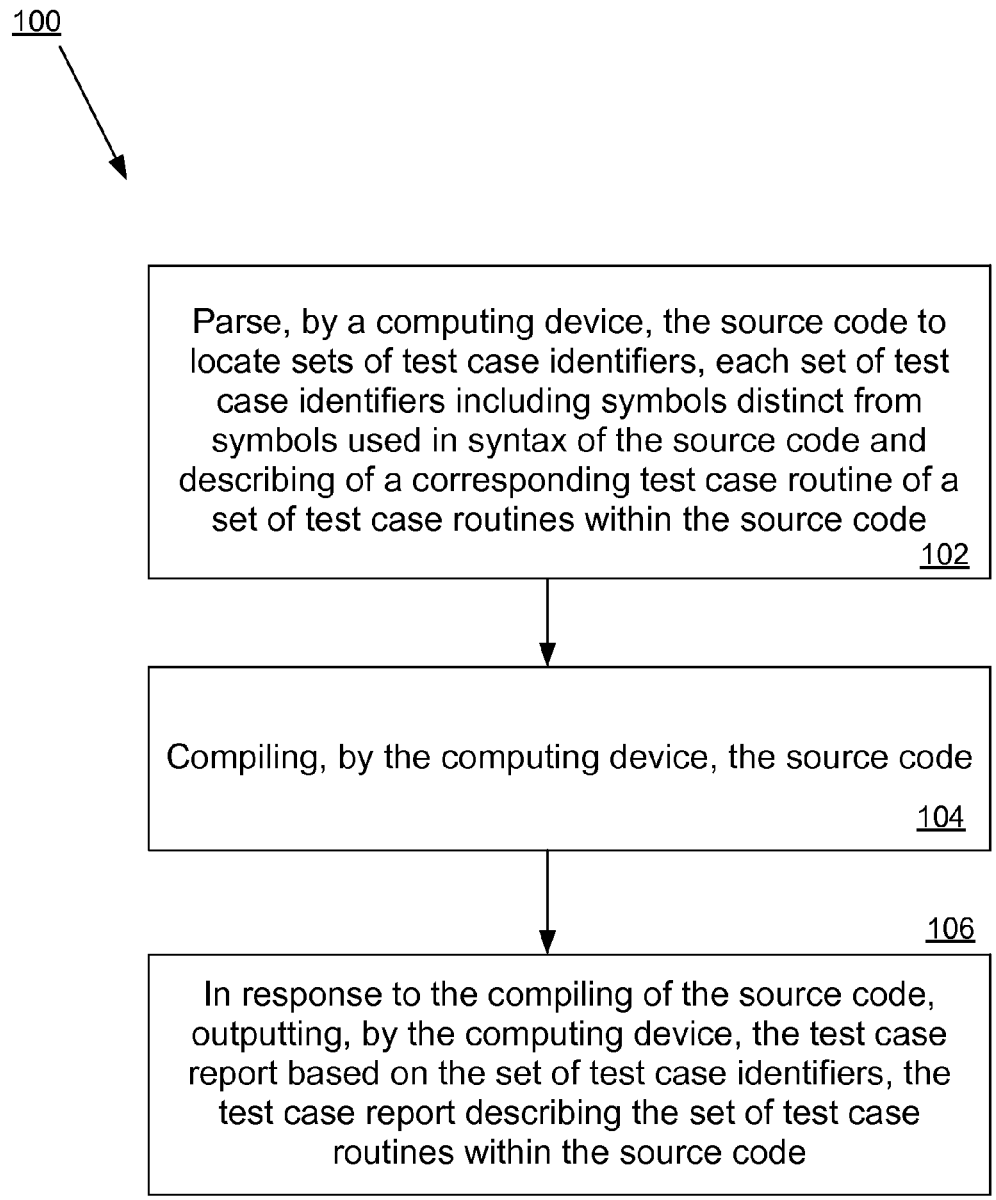
FIG. 6 is a flow chart illustrating an example method of carrying out the improved technique within the computing device shown in FIG. 1.

FIG. 5 illustrates an example scenario in which source code 24 that corresponds to the program under test is written in a first language, e.g., Java, while test case routines, e.g., routine 30, are written in a second language, e.g., Perl. It should be understood that the language of the test case routines may be either compiled or interpretive.

As illustrated in FIG. 5, parser 23 differentiates source code under test 24' from test case code 26. For a compilation process, then, computing device 10 compiles source code under test 24' with a first compiler 22(a), while computing device 10 compiles test case code 26 using a different compiler 22(b).

FIG. 5 illustrates a method 100 of testing whether source code satisfies a set of requirements. In step 102, a computing device, e.g., computing device 10, parses source code, e.g., source code 26, to locate sets of test case identifiers, each set of test case identifiers including symbols distinct from symbols used in syntax of the source code and describing of a corresponding test case routine, e.g., routine 30, of a set of test case routines within the source code. In step 104, the computing device compiles the source code, e.g., via compiler 22. In step 106, the computing device outputs, e.g., via parser 23, the test case report based on the set of test case identifiers, the test case report describing the set of test case routines within the source code.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to computing device 10, which is constructed and arranged to test whether source code satisfies a set of requirements. Some embodiments are directed to a process of testing whether source code satisfies a set of requirements. Also, some embodiments are directed to a computer program product that enables computer logic to test whether source code satisfies a set of requirements.

In some arrangements, computing device 10 is implemented by a set of processors or other types of control/processing circuitry running software. In such arrangements, the software instructions can be delivered, within computing device 10, either in the form of a computer program product 130 (see FIG. 2) or simply instructions on disk or in pre-loaded in memory 20 of computing device 10, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of producing a test case report, the method comprising:
   parsing, by a computing device, source code to locate sets of test case identifiers, each set of test case identifiers including symbols distinct from symbols used in syntax of the source code and describing of a corresponding test case routine of a set of test case routines within the source code;
   compiling, by the computing device, the source code; and
   in response to compiling the source code, outputting, by the computing device, the test case report based on the set of test case identifiers, the test case report describing the set of test case routines within the source code
   wherein the source code is written in a first language, and the test case routines of the set of test case routines are written in a second language distinct from the first language; and
   wherein compiling the source code includes:
      performing a first compilation operation on the source code with a first compiler configured to compile code in the first language; and
      performing a second compilation operation on the test case routines with a second compiler configured to compile code in the second language.

2. A method as in claim 1, wherein outputting the test case report includes generating a web-browser compatible test case report, having a set of entries, each of the set of entries corresponding to a test case routine of the set of test case routines.

3. A method as in claim 2, wherein, for each test case routine of the set of test case routines, an identifier of the set of test case code identifiers to which that test case routine corresponds indicates a use case, a use case providing a high-level description of that test case routine; and wherein generating the web-browser-compatible test case report includes writing the high-level description of that test case routine into the entry of the web-browser-compatible test case report corresponding to that test case routine.

4. A method as in claim 2, wherein, for each test case routine of the set of test case routines, identifiers of the set of test case code identifiers to which that test case routine corresponds indicate a set of test steps, the set of test steps providing a description of operations performed by that test case routine; and wherein generating the web-browser-compatible test case report includes writing the description of the operations performed by that test case routine into the entry of the web-browser-compatible test case report corresponding to that test case routine.

5. A method as in claim 2, wherein, for each test case routine of the set of test case routines, identifiers of the set of test case code identifiers to which that test case routine corresponds indicate ticket numbers representing a set of scenarios, each of the set of scenarios defining a set of requirements to be satisfied by the source code; and wherein generating the web-browser-compatible test case report includes writing the respective ticket number representing each of the set of scenarios into the entry of the web-browser-compatible test case report corresponding to that test case routine.

6. A method as in claim 5, wherein generating the web-browser-compatible test case report further includes writing a table into the web-browser-compatible test case report, the table containing a set of entries, each entry of the set of entries corresponding to a scenario of the set of scenarios and having (i) a ticket number representing that scenario, and (ii) a value of a scenario frequency, the value of the scenario frequency indicating a number of routines in which that scenario has been referenced.

7. A method as in claim 6, wherein writing the respective ticket number representing each of the set of scenarios into the entry of the web-browser-compatible test case report corresponding to that test case routine includes providing, for each ticket number, a hyperlink to a web page that contains a description of the scenario represented by that ticket number; and wherein writing the table into the web-browser-compatible test case report includes, providing, for each ticket number, a hyperlink to a web page that contains the description of the scenario represented by that ticket number.

8. A method as in claim 5, further comprising generating the set of scenarios based on a set of bug reporting tickets from a bug reporting system.

9. A method as in claim 5, wherein outputting the test case report based on the set of test case identifiers further includes for each test case routine of the set of test case routines, indicating whether the source code has satisfied the requirements according to the set of scenarios referenced by that routine.

10. A method as in claim 1, wherein the source code includes comments indicated by the syntax of the source code, and wherein the controlling circuitry constructed and arranged to compile the source code is further constructed and arranged to identify a second set of symbols distinct from the symbols used in the syntax of the source code, the second set of symbols forming a string that indicates (i) a location of a test case routine of the set of test case routines within the source code and (ii) a location of the set of test case identifiers to which the test case routine corresponds, the set of test case identifiers being located within the comments of the source code, the string formed by the second set of symbols being located outside of the comments of the source code.

11. A computer program product comprising anon-transitory, computer-readable storage medium which stored code, the code including a compiler which, when executed by a computing device configured to produce a test case report, causes the computing device to:

parse source code to locate sets of test case identifiers, each set of test case identifiers including symbols distinct from symbols used in syntax of the source code and describing of a corresponding test case routine of a set of test case routines within the source code;

compile the source code; and in response to compiling of source code, output the test case report based on the set of test case identifiers, the test case report describing the set of test case routines within the source code;

wherein the source code is written in a first language, and the test case routines of the set of test case routines are written in a second language distinct from the first language; and wherein compiling the source code includes:
performing a first compilation operation on the source code with a first compiler configured to compile code in the first language; and
performing a second compilation operation on the test case routines with a second compiler configured to compile code in the second language.

12. A computer program product as in claim 11, wherein, for each test case routine of the set of test case routines, an identifier of the set of test case code identifiers to which that test case routine corresponds indicates a use case, a use case providing a high-level description of that test case report routine; and wherein generating the web-browser-compatible test case report includes writing the high-level description of that test case routine into the entry of the web-browser-compatible test case report corresponding to that test case routine.

13. A computer program product as in claim 11, wherein, for each test case routine of the set of test case routines, identifiers of the set of test case code identifiers to which that test case routine corresponds indicate a set of test steps, the set of test steps providing a description of operations performed by that test case routine; and wherein generating the web-browser-compatible test case report includes writing the description of the operations performed by that test case routine into the entry of the web-browser-compatible test case report corresponding to that test case routine.

14. A computer program product as in claim 11, wherein, for each test case routine of the set of test case routines, identifiers of the set of test case code identifiers to which that test case routine corresponds indicate ticket numbers representing a set of scenarios, each of the set of scenarios defining a set of requirements to be satisfied by the source code; and wherein generating the web-browser-compatible test case report includes writing the respective ticket number representing each of the set of scenarios into the entry of the web-browser-compatible test case report corresponding to that test case routine.

15. A computer program product as in claim 14, wherein generating the web-browser-compatible test case report further includes writing a table into the web-browser-compatible test case report, the table containing a set of entries, each entry of the set of entries corresponding to a scenario of the set of scenarios and having (i) a ticket number representing that scenario, and (ii) a value of a scenario frequency, the value of the scenario frequency indicating a number of routines in which that scenario has been referenced.

16. A computer program product as in claim 15, wherein writing the respective ticket number representing each of the set of scenarios into the entry of the web-browser-compatible test case report corresponding to that test case routine includes providing, for each ticket number, a hyperlink to a web page that contains a description of the scenario represented by that ticket number; and wherein writing the table into the web-browser-compatible test case report includes providing, for each ticket number, a hyperlink to a web page that contains the description of the scenario represented by that ticket number.

17. A computer program product as in claim 14, wherein the code further causes the computing device to generate the set of scenarios based on a set of bug reporting tickets from a bug reporting system.

18. A computer program product as in claim 11, wherein the source code includes comments indicated by the syntax of the source code, and wherein the controlling circuitry constructed and arranged to compile the source code is further constructed and arranged to identify a second set of symbols distinct from the symbols used in the syntax of the source code, the second set of symbols forming a string that indicates (i) a location of a test case routine of the set of test case routines within the source code and (ii) a location of the set of test case identifiers to which the test case routine corresponds, the set of test case identifiers being located within the comments of the source code, the string formed by the second set of symbols being located outside of the comments of the source code.

19. A computer program product as in claim 11, wherein compiling the source code includes:

obtaining language identifiers identifying respective languages in which the source code and the set of test case routines are written.

20. An apparatus constructed and arranged to produce a test case report the apparatus comprising a controller including memory and controlling circuitry coupled to the memory, the controlling circuitry being constructed and arranged to:

parse source code to locate sets of test case identifiers, each set of test case identifiers including symbols distinct from symbols used in syntax of the source code and describing of a corresponding test case routine of a set of test case routines within the source code;

compile the source code; and in response to compiling of source code, output the test case report based on the set of test case identifiers, the test case report describing the set of test case routines within the source code;

wherein the source code is written in a first language, and the test case routines of the set of test case routines are written in a second language distinct from the first language; and wherein compiling the source code includes:

performing a first compilation operation on the source code with a first compiler configured to compile code in the first language; and performing a second compilation operation on the test case routines with a second compiler configured to compile code in the second language.

21. An apparatus as in claim 20, wherein the controlling circuitry constructed and arranged to compile the source code is further constructed and arranged to:

obtain language identifiers identifying respective languages in which the source code and the set of test case routines are written.

* * * * *